United States Patent
Huang

(10) Patent No.: US 8,651,027 B2
(45) Date of Patent: Feb. 18, 2014

(54) AVIATION PALLET AND ITS PRODUCING METHOD

(76) Inventor: Zuliang Huang, Ningbo (CN)

(*) Notice: Subject to any disclaimer, the term of this patent is extended or adjusted under 35 U.S.C. 154(b) by 203 days.

(21) Appl. No.: 13/040,268

(22) Filed: Mar. 4, 2011

(65) Prior Publication Data

US 2012/0079966 A1 Apr. 5, 2012

(30) Foreign Application Priority Data

Oct. 1, 2010 (CN) .......................... 2010 1 0502168

(51) Int. Cl.
*B65D 19/38* (2006.01)

(52) U.S. Cl.
USPC ...................................... 108/55.5; 108/57.27

(58) Field of Classification Search
USPC .............. 108/55.5, 57.2, 57.25, 57.27–57.28, 108/901
See application file for complete search history.

(56) References Cited

U.S. PATENT DOCUMENTS

| | | | | |
|---|---|---|---|---|
| 3,434,434 A | * | 3/1969 | Horton, Jr. ................... | 108/51.3 |
| 3,524,415 A | * | 8/1970 | Heiman ........................ | 108/53.3 |
| 3,613,605 A | * | 10/1971 | Holdredge, Jr. ........... | 108/57.28 |
| 3,951,078 A | * | 4/1976 | Fowler et al. ............... | 108/57.28 |
| 6,224,706 B1 | * | 5/2001 | Matich .......................... | 156/212 |
| 6,659,020 B1 | * | 12/2003 | Ball ............................ | 108/57.28 |
| 6,786,992 B2 | * | 9/2004 | Dummett ....................... | 156/212 |
| 2002/0094427 A1 | * | 7/2002 | Edwards et al. ........... | 428/297.4 |
| 2003/0041956 A1 | * | 3/2003 | Pigott et al. .............. | 156/244.11 |
| 2006/0011108 A1 | * | 1/2006 | Abu-Isa et al. ............ | 108/57.25 |
| 2007/0202345 A1 | * | 8/2007 | McGarel et al. ................ | 428/516 |
| 2007/0277706 A1 | * | 12/2007 | Carter et al. .................. | 108/51.3 |
| 2011/0065819 A1 | * | 3/2011 | Schips et al. .................... | 521/59 |

FOREIGN PATENT DOCUMENTS

| | | | | |
|---|---|---|---|---|
| FR | 2812234 A1 | * | 2/2002 | ............. B29C 44/44 |
| WO | WO 2009006654 A1 | * | 1/2009 | ............. B65D 19/00 |

* cited by examiner

*Primary Examiner* — Hanh V Tran

(57) ABSTRACT

An aviation pallet includes an EPS loading board, which includes an EPS plate and at least three EPS supporting legs extended from the bottom surface of the EPS plate for supporting the EPS plate, wherein the EPS plate and the EPS supporting legs are wholly injection molded; and a PET film adhering to the surface of the EPS plate and the surface of the EPS supporting legs; and has a plurality of jacks provided between each two EPS supporting legs. A method of producing the aviation pallet includes forming a main body step: laminating step; heating and cutting steps; vacuum forming step; and cooling and shape steps. The aviation pallet has good mechanical properties, folding resistance, most solvents resistance, low and high temperature resistance, and is lightweight, no poison, no smell, healthy and safe.

1 Claim, 3 Drawing Sheets

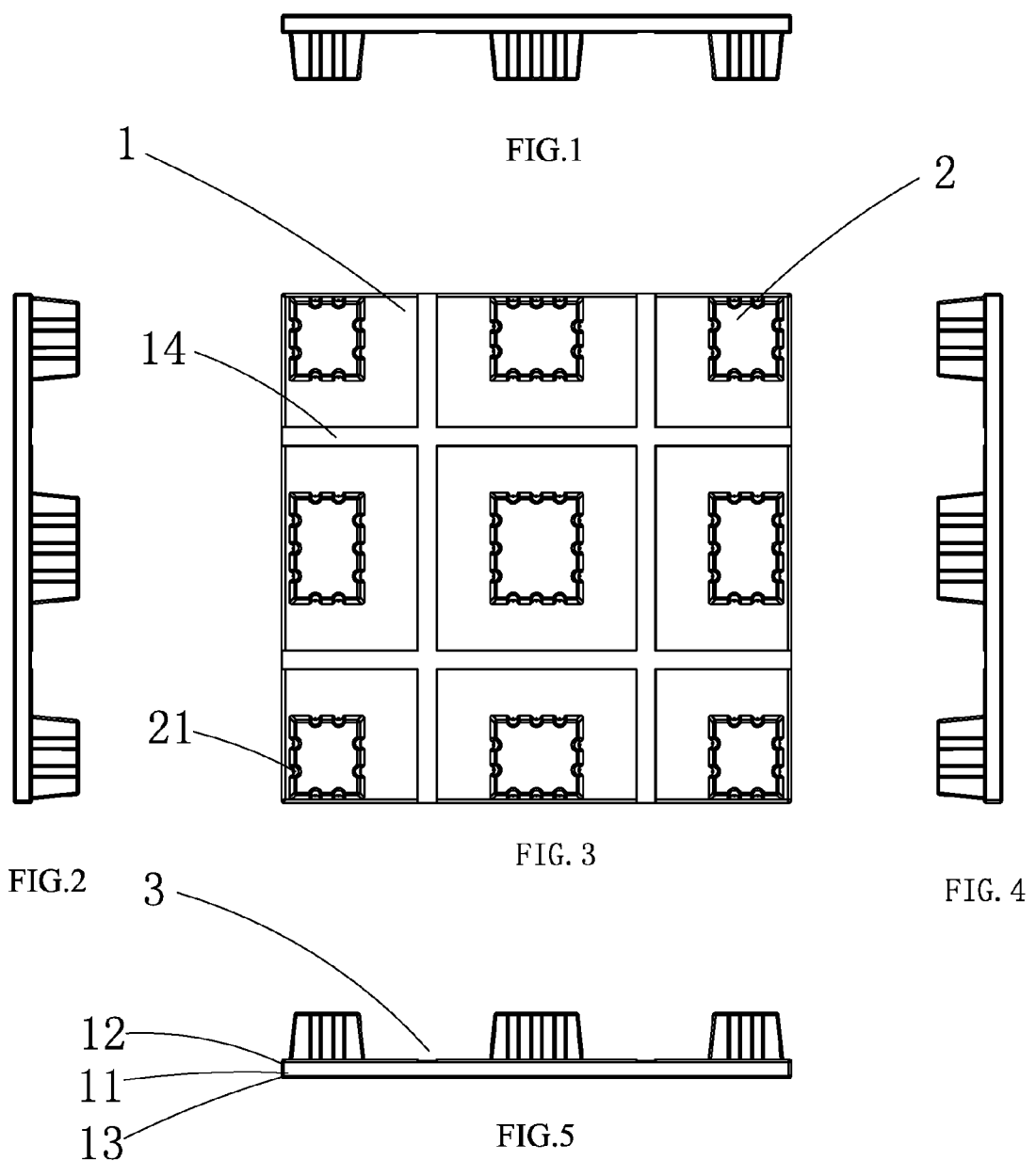

AVIATION PALLET AND ITS PRODUCING METHOD

BACKGROUND OF THE PRESENT INVENTION

1. Field of Invention

The present invention relates to assistant tools for warehouse, cargo and stacking, and more particularly to an aviation pallet and its producing method.

2. Description of Related Arts

At present, the assistant tools used in warehouse, cargo and stacking include wooden bracket, metal bracket and plastic bracket.

The wooden bracket is mainly made of wood which causes it is prone to moisture and rot, even parasites, hence it does not meet the health and hygiene requirements of modern logistics. Furthermore, wooden productions bring deforestation which will spoil the ecological environment, so that they can no longer meet the requirements of modern society.

The metal bracket has the disadvantages of heavy weight, high cost and being prone to rust, which limit its widespread use.

Currently, the plastic pallet is widely used. The Chinese Patent No. ZL200520029955.6 discloses a round-hole plastic pallet, which is produced by whole injection molding with high density polyethylene. There are convex-concave patterns on the front surface of the plastic pallet so as to avoid skidding, and the front surface has nine round-holes provided in the middle thereof. The side surface of the plastic pallet has jacks therein. The reverse surface of the plastic pallet has nine square legs, and there are a plurality of jacks among the square legs. Polyethylene has the advantages of excellent low temperature performance (the lowest service temperature can reach $-70°$ C. to $-100°$ C.), good chemical stability, excellent electrical insulation property, resistance against most acid-base erosion, being insoluble in common solvents at room temperature, and small water absorption. However, owing to its linear molecular structure, polyethylene can be slowly dissolved in certain organic solvents. Moreover, it is very sensitive to the environmental stress of chemical action and mechanical action, and has poor resistance to heat and aging.

SUMMARY OF THE PRESENT INVENTION

An object of the present invention is to provide an aviation pallet, which has low and high temperature resistance, excellent mechanical properties, good solvent resistance, and is foldable, healthy, safe and lightweight.

Another object of the present invention is to provide a method of producing the above aviation pallet.

Accordingly, in order to accomplish the above objects, the present invention provides an aviation pallet, comprising:

an expanded polystyrene (EPS) loading board, which comprises an EPS plate and at least three EPS supporting legs extended from the bottom surface of the EPS plate for supporting the EPS plate, wherein the EPS plate and the EPS supporting legs are wholly injection molded; and a polyethylene terephthalate (PET) film adhering to the surface of the EPS plate and the surface of the EPS supporting legs; wherein the EPS loading board has a plurality of jacks provided between each two adjacent EPS supporting legs.

Furthermore, the PET film is adhered to the surface of the EPS plate and the surface of the EPS supporting legs via an EVA adhesive layer.

The EPS plate has a length of about 500-2000 mm, a width of about 500-2000 mm, and a thickness of about 30-200 mm.

Each of the EPS supporting legs has a length of about 150-300 mm, a width of about 100-200 mm, and a thickness of about 50-150 mm.

The PET film has a thickness of about 0.4-2 mm, and the EVA adhesive layer has a thickness of about 0.03-0.1 mm.

Preferably, the loading board comprises nine EPS supporting legs, which are arranged in a three-by-three matrix.

The EPS supporting legs are square columns or cylindrical columns, and the side surface of each EPS supporting legs has a plurality of wave-shaped grooves thereon.

The EPS loading board has a plurality of slots on the back surface thereof, wherein the slots are corresponding to the jacks. During using, the slots are able to match with strapping tapes, so as for the strapping tapes to fix goods on the aviation pallet easily and tightly.

The EVA adhesive layer contains C5 hydrogen resin, which is able to enhance the adhesiveness and stability of an adhesive layer, preferably, the C5 hydrogen resin content by weight is from 5% to 15%. The C5 hydrogen resin is based on the C5 fraction derived from ethylene cracking, formed by the cationic polymerization of diene and monoene in C5 fraction. The C5 hydrogen resin is able to improve adhesive properties, so it is an essential tackifying component for most adhesives.

The present invention also provides a method of producing the above aviation pallet, which comprises the steps of:

(a) forming wholly a EPS loading board with an EPS foam, wherein the EPS loading board has a EPS plate and at least three EPS supporting legs;

(b) coating an EVA adhesive layer having a thickness of about 0.03-0.1 mm on a side of a PET film;

(c) heating the EVA adhesive layer and the PET film at a temperature from $100°$ C. to $140°$ C. to soften and extend the PET film and melt the EVA adhesive layer;

(d) cutting the PET film according to the size of the EPS loading board;

(e) adhering the EVA adhesive layer which is coated on the PET film to the surface of the EPS loading board and producing a vacuum between the PET film and the EPS loading board, so as to use atmospheric pressure to make the PET film adhering closely to the EPS loading board by the EVA adhesive layer;

(f) cooling the PET film and the EPS loading board, and shaping the PET film and the EPS loading board by removing excess materials from the PET film and the EPS loading board.

Comparing with the existing technology, the EPS loading board of the present invention adopts EPS as the main material, and the surfaces of the EPS loading board is adhered to a PET film via an EVA adhesive layer. EPS is short for expandable polystyrene, produced from polystyrene by a series process such as previous foaming, aging, molding, drying and cutting, EPS has advantages of light weight, excellent insulation, but its impact resistance and tensile strength are poor. PET is short for polyethylene terephthalate, also known as terylene resin or linear polyester resin. The PET film has good mechanical properties, and 3 to 5 times impact strength of other films. The PET film is resistant to folding, oil, fat, diluted acid, diluted alkali, and most solvents. It also has excellent resistance to high and low temperature, concretely, it can be used at about $120°$ C. in long term, and can be used at about $150°$ C. or about minus $70°$ C. in short time, meanwhile, the high or low temperature has little effect on its mechanical properties. Furthermore, the PET film has advantages of low gas and water vapor permeabilities which result in its resistance to gas, water, oil and other peculiar smells; high transparency; UV blocking function; good gloss; no poison; no smell; health and safety.

The advantage of the present invention is adhering the PET film to the EPS loading board which is made of EPS material, so that the aviation pallet not only has the EPS's advantage of lightweight, but also overcomes its disadvantages of poor impact resistance and tensile strength. Moreover, the aviation pallet has PET film's good mechanical properties, and also has the advantages of folding resistance; most solvents resistance; low and high temperature resistance; low gas and water vapor permeabilities; high transparency; UV blocking function; good gloss; no poison; no smell; health and safety.

These and other objectives, features, and advantages of the present invention will become apparent from the following detailed description, the accompanying drawings, and the appended claims.

BRIEF DESCRIPTION OF THE DRAWINGS

FIG. 1 is a schematic top view of an aviation pallet according to a preferred embodiment of the present invention;

FIG. 2 is a schematic left view of the aviation pallet according to the preferred embodiment of the present invention;

FIG. 3 is a schematic front view of the aviation pallet according to the preferred embodiment of the present invention;

FIG. 4 is a schematic right view of the FIG. 3;

FIG. 5 is a schematic bottom front view of the FIG. 3;

DETAILED DESCRIPTION OF THE PREFERRED EMBODIMENT

Figure 6:
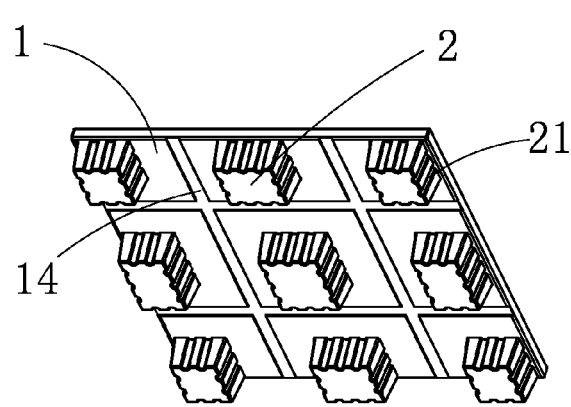
FIG. 6 is a perspective front view of the aviation pallet according to the preferred embodiment of the present invention.
Figure 7:
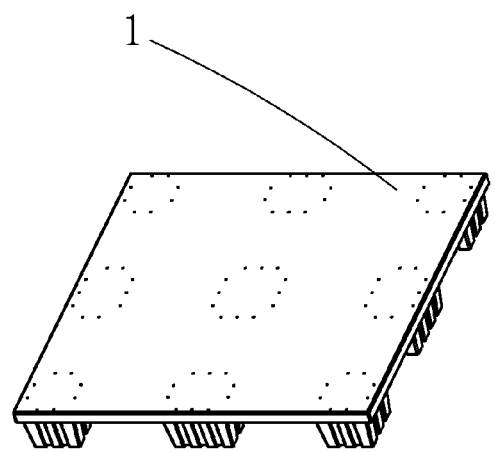
FIG. 7 is a perspective back view of the aviation pallet according to the preferred embodiment of the present invention.
Figure 8:
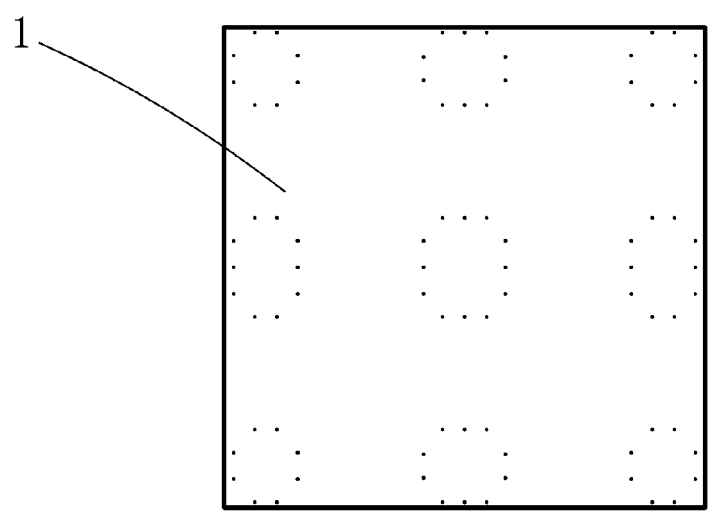
FIG. 8 is a schematic back view of the FIG. 3.

Hereinafter, the present invention will be disclosed by describing specific preferred embodiments of the present invention with reference to drawings.

The reference numerals in the FIG. 1 to FIG. 9 are illustrated as follows: 1 EPS loading board; 11 EPS plate; 12 PET film; 13 EVA adhesive layer; 14 slot; 2 EPS supporting lag; 21 waved-shaped groove; 3 jack.

Referring to FIG. 1 to FIG. 8 of the drawings, an aviation pallet according to a preferred embodiment of the present invention is illustrated. The aviation pallet comprises: an expanded polystyrene (EPS) loading board 1, which comprises an EPS plate 11 and at least three EPS supporting legs 2 extended from the bottom surface of the EPS plate 11 for supporting the EPS plate 11, wherein the EPS plate 11 and the EPS supporting legs 2 are wholly injection molded; and a polyethylene terephthalate (PET) film 12 adhering to the surface of the EPS plate 11 and the surface of the EPS supporting legs 2.

Furthermore, the aviation pallet has a plurality of jacks 3 provided between each two adjacent EPS supporting legs 2.

According to the preferred embodiment of the present invention, the aviation pallet further comprise an ethylene vinyl acetate (EVA) adhesive layer 13 sandwiched between the surface of the EPS loading board 1 and the PET film 12. That is, the PET film 12 is adhered to the surface of the EPS loading board 1 via the EVA adhesive layer 13. Here, the surface of the EPS loading board 1 comprises the surface of the EPS plate 11 and the surface of the EPS supporting legs 2.

The EPS plate 11 has a length of about 500-2000 mm, a width of about 500-2000 mm, and a thickness of about 30-200 mm.

Each of the EPS supporting legs 2 has a length of about 150-300 mm, a width of about 100-200 mm, and a thickness of about 50-150 mm.

The PET film 12 has a thickness of about 0.4-2 mm, and the EVA adhesive layer 13 has a thickness of about 0.03-0.1 mm.

According to the preferred embodiment of the present invention, the EPS plate 11 has a length of about 1000 mm, a width of about 900 mm, and a thickness of about 40 mm.

Each of the EPS supporting legs 2 has a length of about 200 mm, a width of about 100-130 mm, and a thickness of about 100 mm.

The PET film 12 has a thickness of about 0.4-0.8 mm, while the EVA adhesive layer 13 has a thickness of about 0.03-0.1 mm.

According to the preferred embodiment of the present invention, the loading board 1 comprises nine EPS supporting legs 2, which are arranged in a three-by-three matrix.

The EPS supporting legs 2 are square columns or cylindrical columns. Preferably, the side surface of each EPS supporting legs 2 has a plurality of symmetrical wave-shaped grooves 21 thereon.

According to the preferred embodiment of the present invention, the EPS loading board 1 has a plurality of slots 14 on the back surface of the EPS loading board 1, wherein the slots 14 are corresponding to the jacks 3. During using, the slots 14 are able to match with strapping tapes, so as for the strapping tapes to fix goods on the aviation pallet easily and tightly.

According to the preferred embodiment of the present invention, the EVA adhesive layer 13 contains C5 hydrogen resin, which is able to enhance the adhesiveness and stability of an adhesive layer, preferably, the C5 hydrogen resin content by weight is from 5% to 15%.

The C5 hydrogen resin is based on the C5 fraction derived from ethylene cracking, formed by the cationic polymerization of diene and monoene in C5 fraction. The C5 hydrogen resin is able to improve adhesive properties, so it is an essential tackifying component for most adhesives.

Figure 9:
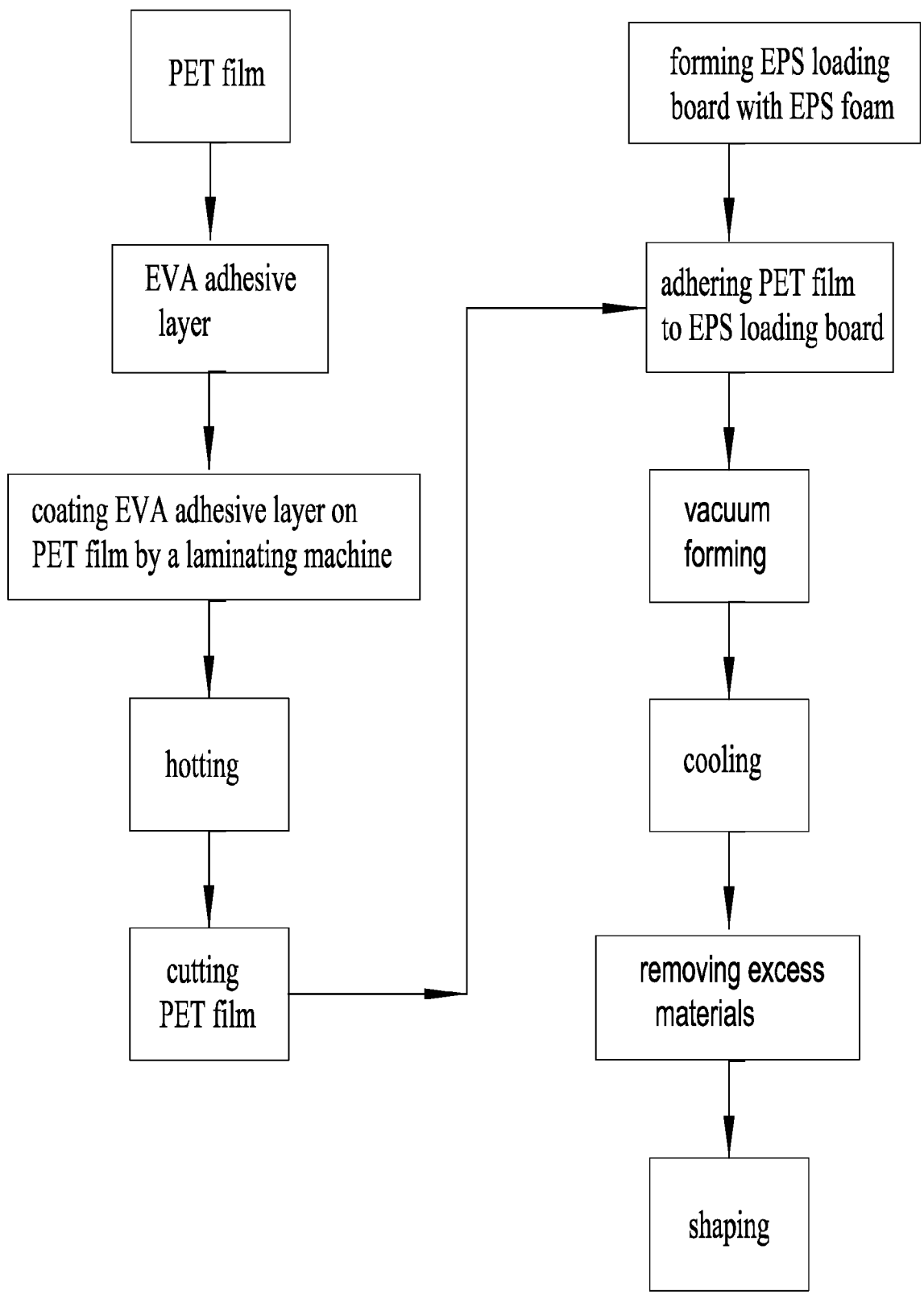
FIG. 9 is a flow diagram of a method of producing the aviation pallet according to the preferred embodiment of the present invention.

Referring to FIG. 9 of the drawings, a method of producing the above aviation pallet comprises the steps of:

Forming a main body step:

(a) forming wholly a EPS loading board 1 with an EPS foam, wherein the EPS loading board 1 has a EPS plate 11 and at least three EPS supporting legs 2;

Laminating step:

(b) coating an EVA adhesive layer 13 on a side of a PET film 12;

Here, using a laminating machine to coat the EVA adhesive layer 13 on one side of the PET film 12, and the EVA adhesive layer 13 has a thickness of about 0.03-0.1 mm.

Heating and cutting steps:

(c) heating the EVA adhesive layer 13 and the PET film 12 at a temperature from 100° C. to 140° C. to soften and extend the PET film 12, and melt the EVA adhesive layer 13;

(d) cutting the PET film 12 according to the size of the EPS loading board 1, so as to fit the EPS loading board 1;

Vacuum forming step:

(e) adhering the EVA adhesive layer 13 which is coated on the PET film 12 to the surface of the EPS loading board land producing a vacuum between the PET film 12 and the EPS loading board 1, so as to use atmospheric pressure to make the PET film 12 adhering closely to the EPS loading board 1 by the EVA adhesive layer 13;

Cooling and shaping steps:

(f) cooling the PET film 12 and the EPS loading board 1 and shaping the PET film 12 and the EPS loading board 1 by removing excess materials from the PET film 12 and the loading board 1.

Comparing with the existing technology, the EPS loading board of the present invention adopts EPS as the main material, and the surfaces of the EPS loading board is adhered to a PET film via an EVA adhesive layer. EPS is short for expandable polystyrene, produced from polystyrene by a series process such as previous foaming, aging, molding, drying and cutting, EPS has advantages of light weight, excellent insulation, but its impact resistance and tensile strength are poor. PET is short for polyethylene terephthalate, also known as terylene resin or linear polyester resin. The PET film has good mechanical properties, and 3 to 5 times impact strength of other films. The PET film is resistant to folding, oil, fat, diluted acid, diluted alkali, and most solvents. It also has excellent resistance to high and low temperature, concretely, it can be used at about 120° C. in long term, and can be used at about 150° C. or about minus 70° C. in short time, meanwhile, the high or low temperature has little effect on its mechanical properties. Furthermore, the PET film has advantages of low gas and water vapor permeabilities which result in its resistance to gas, water, oil and other peculiar smells; high transparency; UV blocking function; good gloss; no poison; no smell; health and safety.

The advantage of the present invention is adhering the PET film to the EPS loading board which is made of EPS material, so that the aviation pallet not only has the EPS's advantage of lightweight, but also overcomes its disadvantages of poor impact resistance and tensile strength. Moreover, the aviation pallet has PET film's good mechanical properties, and also has the advantages of folding resistance; most solvents resistance; low and high temperature resistance; low gas and water vapor permeabilities; high transparency; UV blocking function; good gloss; no poison; no smell; health and safety.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An aviation pallet, comprising:

a loading board, which comprises an expanded polystyrene (EPS) plate and at least three EPS supporting legs extended from the bottom surface of the EPS plate for supporting the EPS plate, wherein the EPS plate and the EPS supporting legs are wholly injection molded to be integrated;

a polyethylene terephthalate (PET) film adhering to the surface of the EPS plate and the surface of the EPS supporting legs; and a plurality of jacks provided between two EPS supporting legs, wherein the PET film is adhered on the surface of the EPS plate and the surface of the EPS supporting legs via an ethylene vinyl acetate (EVA) adhesive layer, wherein the EPS plate has a length of 1000 mm, a width of 900 mm, and a thickness of 40 mm, wherein each of the EPS supporting legs has a length of 200 mm, a width of 100-130 mm, and a thickness of 100 mm, wherein the PET film has a thickness of 0.4-0.8 mm, wherein the EVA adhesive layer has a thickness of 0.03-0.1 mm, wherein the loading board comprises nine EPS supporting legs, which are arranged in a three-by-three matrix, wherein the EPS supporting legs are square columns or cylindrical columns, wherein the side surface of each EPS supporting legs has a plurality of wave-shaped grooves thereon, wherein the loading board has a plurality of slots on the back surface thereof, wherein the slots are corresponding to the jacks, the slots can be matched with strapping tapes, so as for the strapping tapes to fix goods on the aviation pallet, wherein the EVA adhesive layer contains C5 hydrogen resin, wherein the C5 hydrogen resin content by weight is from 5% to 15%.

* * * * *